United States Patent
Chang et al.

(10) Patent No.: US 8,225,107 B2
(45) Date of Patent: Jul. 17, 2012

(54) METHODS OF STORING AND RETRIEVING DATA IN/FROM EXTERNAL SERVER

(75) Inventors: Ku-young Chang, Daejeon-si (KR);
Do-won Hong, Daejeon-si (KR);
Hyun-sook Cho, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 362 days.

(21) Appl. No.: 12/580,603

(22) Filed: Oct. 16, 2009

(65) Prior Publication Data

US 2010/0161957 A1    Jun. 24, 2010

(30) Foreign Application Priority Data

Dec. 18, 2008    (KR) .................. 10-2008-0129287

(51) Int. Cl.
 *H04L 9/00* (2006.01)
(52) U.S. Cl. ......... 713/189; 713/193; 707/802; 707/803
(58) Field of Classification Search ........... 707/802–803
See application file for complete search history.

(56) References Cited

U.S. PATENT DOCUMENTS

| 7,171,566 | B2 * | 1/2007 | Durrant ......................... 713/189 |
| 7,426,752 | B2 * | 9/2008 | Agrawal et al. ................. 726/26 |
| 2006/0041533 | A1 * | 2/2006 | Koyfman ......................... 707/3 |
| 2010/0138456 | A1 * | 6/2010 | Aghili ......................... 707/803 |

FOREIGN PATENT DOCUMENTS

| JP | 2000-194709 | 7/2000 |
| KR | 2003-0015677 | 2/2003 |
| KR | 1020070047244 | 5/2007 |
| KR | 10-0839220 | 6/2008 |
| WO | 2005/114478 A2 | 12/2005 |

OTHER PUBLICATIONS

Hacigumus et al, "Executing SQL over Encrypted Data in the Database-Service-Provider Model", copyright 2002, pp. 216-227.*
Boneh, Dan et al., "Conjunctive, Subset and Range Queries on Encrypted Data," *Lecture Notes in Computer Science*, vol. 4392:535-554 (2007).
Hacigümüş, Hakan et al., "Executing SQL over Encrypted Data in the Database-Service-Provider Model," *Proceedings of the 2002 ACM SIGMOD International Conference on Management of Data*, pp. 216-227 (2002).

* cited by examiner

*Primary Examiner* — Ponnoreay Pich
(74) *Attorney, Agent, or Firm* — Nelson Mullins Riley & Scarborough LLP; EuiHoon Lee, Esq.

(57) ABSTRACT

Provided are methods of storing and searching for data in encrypted form. The method of storing data in encrypted form includes: encrypting desired data from among data stored in a database; dividing an entire region of the stored data into a plurality of bucket regions and allocating an index to each of the bucket regions; identifying order information in a bucket region to which the encrypted data belongs; and storing the encrypted data, index information of the bucket region to which the encrypted data belongs, and the identified order information in an external server. When a database containing important data of at least one user is stored in an external server using the above storing method, the security and efficiency of the database can be increased.

9 Claims, 5 Drawing Sheets

FIG.2

| ID  | salary |
|-----|--------|
| 23  | 510    |
| 398 | 350    |
| 113 | 700    |
| 235 | 660    |
| 247 | 450    |
| 377 | 770    |
| 345 | 590    |
| 78  | 420    |

FIG.5

| E-tuple | E-ID | | E-salary | |
|---|---|---|---|---|
| | index | order | index | order |
| 1100110011100... | $a_1$ | 1110101 | $\beta_2$ | 1100110 |
| 1000011100010... | $a_3$ | 1111101011 | $\beta_1$ | 10000000 |
| 1010011001111... | $a_1$ | 1001000010 | $\beta_3$ | 100000000 |
| 1111010000111... | $a_2$ | 101100110 | $\beta_3$ | 100110011 |
| 1001011001110... | $a_2$ | 111100001 | $\beta_1$ | 1100000000 |
| 1110111100010... | $a_3$ | 1100010100 | $\beta_3$ | 1101100110 |
| 1000000001100... | $a_3$ | 111001100 | $\beta_2$ | 1110011001 |
| 1001011010010... | $a_1$ | 110001111 | $\beta_1$ | 1001100110 |

METHODS OF STORING AND RETRIEVING DATA IN/FROM EXTERNAL SERVER

CROSS-REFERENCE TO RELATED APPLICATION

This application claims the benefit under 35 U.S.C. §119 (a) of Korean Patent Application No. 10-2008-0129287, filed on Dec. 18, 2008, the disclosure of which is incorporated by reference in its entirety for all purposes.

BACKGROUND

1. Field

The following description relates to methods of storing and retrieving data, and more particularly, to methods of storing and retrieving data in encrypted form.

2. Description of the Related Art

Recently, incidents of leakage of important information (such as customer information) stored in a database by a hacker or an insider have frequently occurred. Accordingly, the security of information stored in a database is becoming a more important issue. In particular, when data is stored in an unreliable external server, the security of the data is at greater risk.

However, as the amount of data to be processed increases exponentially and as the demand for various services increases, the use of external servers is also increasing. Therefore, a method of safely storing a database containing user information in an unreliable external server and efficiently conducting various searches is required.

When a user stores important data in an external server, the probability that the data will be leaked or maliciously used by a server administrator or an insider is greater than when the user stores the data in his or her own database. Hence, it is essential to encrypt a database. However, if a user encrypts a database using a secret key and stores the encrypted database in an external server, the external server cannot search for data requested by the user. For this reason, methods of adding additional information, such as an index, to encrypted data and searching for necessary data using the additional information have been suggested.

Boneh and Waters (Theory of Cryptography, 2007) have suggested a cryptography-based method of searching for encrypted data supporting conjunctives, subsets, and range queries. However, this method requires too much computational power, and thus although in theory it is feasible, in practice it cannot be implemented.

Hacigumus and others (ACM SIGMOD, 2002) have suggested a bucket-based index method that can actually be applied to a database. In this method, each data in a database is encrypted, and the entire region of the data is divided into a plurality of sub-regions called buckets. Then, an index is allocated to each of the buckets. When a user transmits an index of a bucket to an external server, the external server transmits all encrypted data included in the bucket to the user. Accordingly, the user decrypts all of the received data to obtain desired data. In this method, even when the user needs only a portion of the received data, the user has to decrypt all of the received data. Consequently, the computational power required of the users system is increased.

SUMMARY

The following description relates to a data storing method which can increase the security of a database containing data regarding at least one user when the database is stored in an unreliable server.

The following description also relates to a data search method which can improve the efficiency of decrypting encrypted data.

According to an exemplary aspect, there is provided a method of storing data in a database in encrypted form. The method includes encrypting desired data from among data stored in a database, dividing an entire region of the stored data into a plurality of bucket regions and allocating an index to each of the bucket regions, identifying order information in a bucket region to which the encrypted data belongs, and storing the encrypted data, index information of the bucket region to which the encrypted data belongs, and the identified order information in an external server.

In the dividing of the entire region and the allocating of the index, the entire region of the stored data is divided in such a way that causes a minimum difference between the numbers of elements of the encrypted data in the bucket regions.

The dividing of the entire region and the allocating of the index includes generating a random number for security, adding the generated random number to each of the bucket regions, and allocating an index to each of the bucket regions to which the generated random number has been added.

In the identifying of the order information, encrypted order information is generated using an encryption function for encrypting the order information. The encryption function includes a data value and starting and end values of the bucket region to which the encrypted data belongs as variables.

The method further includes encrypting new data added to the database and allocating an index to a bucket region to which the encrypted new data belongs, identifying order information in the bucket region to which the encrypted new data belongs, and storing the encrypted new data, index information of the bucket region, and the identified order information in the external server.

According to another exemplary aspect, there is provided a method of searching for encrypted data stored in a database. The method includes receiving a search query and searching for encrypted data from an external server based on the received search query, and decrypting and outputting at least a portion of the found, encrypted data.

The receiving of the search query and the searching of the encrypted data includes receiving query information, which comprises data type information and data range information, from a user, identifying index information of a bucket region, which comprises data corresponding to the query information, based on random number information and index information stored in advance, transmitting the identified index information to the external server; and receiving encrypted data, which belongs to the bucket region corresponding to the index information, from the external server.

The method further includes identifying a bucket region, to which limit values of the data range information belong, based on the identified index information and generating order information of the limit values of the data range information in the identified bucket region after the identifying of the index information.

Other objects, features and advantages will be apparent from the following description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain aspects of the invention.

FIG. 2 is a diagram illustrating an exemplary database containing user IDs and salaries;

FIG. 5 is an exemplary format of data stored in an external server.

DETAILED DESCRIPTION

The above and other features and advantages of the present invention will become more apparent by describing exemplary embodiments thereof with reference to the attached drawings. Exemplary embodiments of the present invention will now be described in detail so that they can be readily understood and applied by those skilled in the art.

Figure 1:
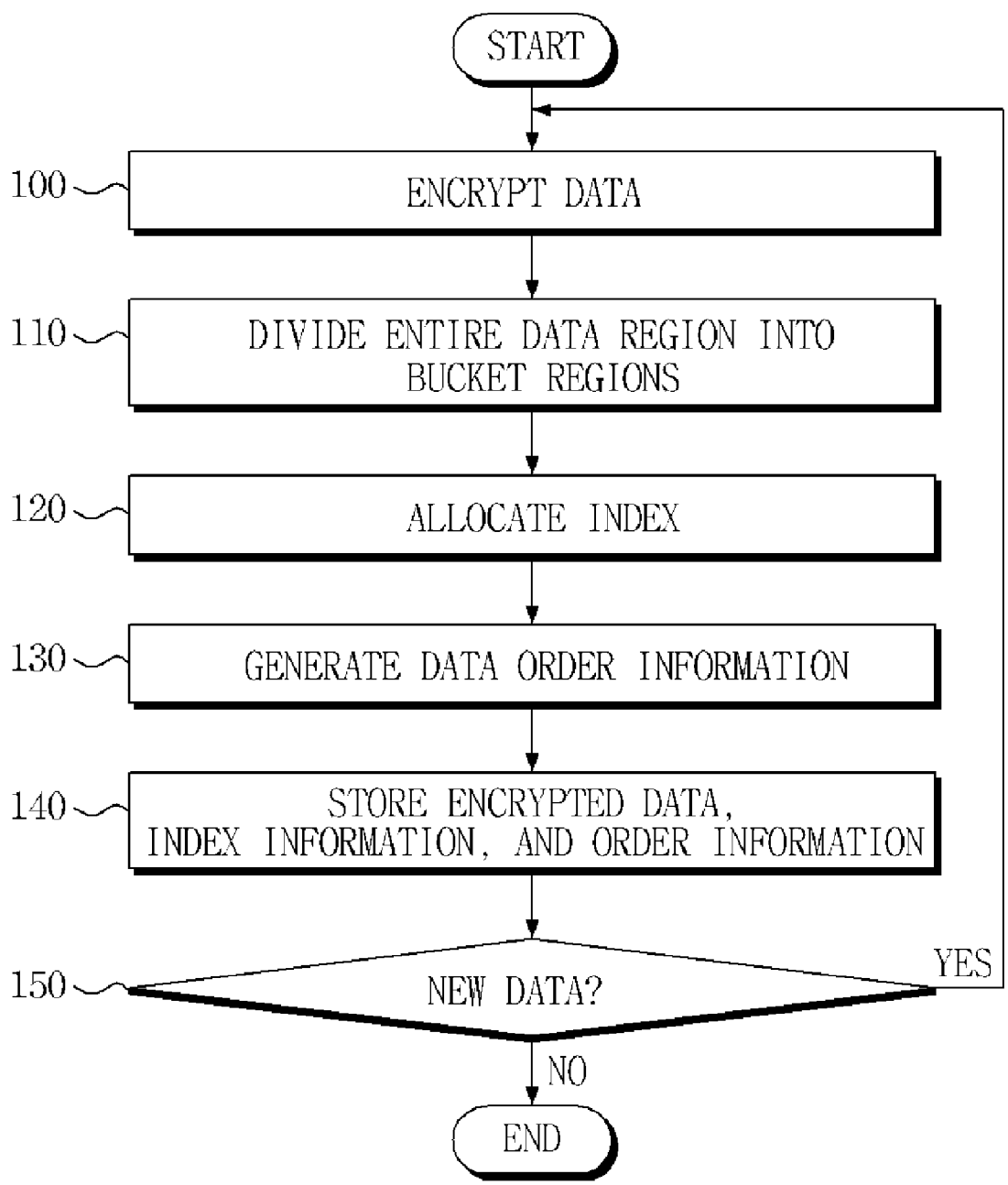
FIG. 1 is a flowchart illustrating a method of storing data of a database according to an exemplary embodiment.
Figure 3:
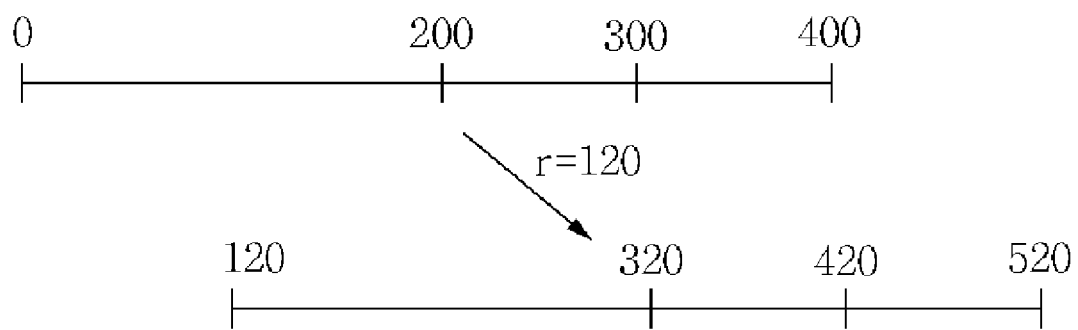
FIG. 3 is a diagram illustrating bucket region conversion using a random number.

FIG. 1 is a flowchart illustrating a method of storing data in an external server according to an exemplary embodiment. FIG. 2 is a diagram illustrating an exemplary database containing user IDs and salaries. FIG. 3 is a diagram illustrating bucket region conversion using a random number.

Referring to FIG. 1, a user generates a secret key "K" to encrypt data that the user desires to store in an external server from among data stored in his or her database. Then, the user encrypts the desired data stored in the database by using a symmetric key encryption algorithm (operation 100).

Next, the user divides the entire region of the data stored in the database into a plurality of sub-regions called bucket regions (operation 110). Here, if the entire region of the data is divided into a plurality of bucket regions of equal size, and if elements of the data are concentrated in certain bucket regions, this may create the risk of the data distribution being revealed. For this reason, the entire region of the data stored in the database must be divided such that the elements of the data are evenly distributed among the bucket regions.

Referring to the database illustrated in FIG. 2, when an entire user ID range is [0, 400], it may be divided into three bucket regions [0, 200], [200, 300], and [300, 400]. In this case, three elements 23, 78, and 113 are included in the bucket region [0, 200]. In addition, two elements 235 and 247 are included in the bucket region [200, 300], and three elements 345, 377, and 398 are included in the bucket region [300, 400].

Next, the user generates an index representing each of the bucket regions (operation 120). To improve security, the user generates a random number "r" and adds the generated random number "r" to each of the bucket regions.

In the current exemplary embodiment, the random number "r" may be 120. Referring to FIG. 3, the bucket region [0, 200] is converted into a bucket region [120, 320] using the random number "r", and the bucket region [200, 300] is converted into a bucket region [320, 420] using the random number "r". Then, arbitrary indexes $\alpha_1$, $\alpha_2$, and $\alpha_3$ are set for the new bucket regions [120, 320], [320, 420], and [420, 520], respectively.

Referring to the database illustrated in FIG. 2, when a user ID is 377, 377+r(=120)=497 and 497 is included in the bucket region [420, 520]. Accordingly, the index $\alpha_3$ is allocated.

In the current exemplary embodiment, for data security, the user stores the random number "r" and each piece of bucket information and maintains them using secret values that only the user knows. Here, bucket information denotes information about a starting point and an end point of a bucket region. The user further stores an index value allocated to each bucket region. Since the index value should be stored in the external server, the need for keeping the index value secret is low.

In the current exemplary embodiment, the user stores the random number "r" (=120) as well as bucket information and index information, that is, ([120, 320], $\alpha_1$), ([320, 420], $\alpha_2$), and ([420, 520], $\alpha_3$). Here, r=120 and the bucket information 120, 320, 420, and 520 are used as secret values.

In the current exemplary embodiment, an index may be set to a value obtained by applying a hash function to a starting value of a bucket region. For example, an index of the bucket region [120, 320] may be set to $\alpha_1$=h(120), where "h" is a hash function. The method of setting an index is not limited to the above example, and can include various modifications.

Next, order information of data included in each bucket region is generated (operation 130). In the current exemplary embodiment, order information is generated using an encryption function for encrypting data order information. For example, when a bucket region is [a, b] and $\chi_1 \in$ [a, b], an order preserving encryption function "f" may be generated as follows:

$$f_{[a,b)}(x_1) = \left[\frac{x_1 - a}{b - a}\right] \cdot 2^t,$$

where [c] is a floor function. For example, [1.11]=1. The order preserving encryption function "f" is a function that converts data $\chi_1$ into a value between 0 and $2^t$.

That is, for $\chi_1, \chi_2 \in$ [a, b], if $\chi_1 < \chi_2$, then $f_{[a,b]}(\chi_1) < f_{[a,b]}(\chi_2)$. Here, "t" is set to a value such that $2^t$ is far greater than the number of pieces of data included in a bucket region. For example, a user ID of 235 in the database of FIG. 2 is converted into 355 using the random number "r" (=120), and 355 is included in the bucket region [320, 420]. In this case, if t=10, the order information for the user ID 235 is generated as follows:

$$f_{[320,420)}(355) = \left[\frac{355 - 320}{420 - 320}\right] \cdot 2^{10} = 358 = 101100110_2$$

where $101100110_2$ is a binary representation of 358.

As described above, the order information is calculated based on a starting value and an end value of a bucket region to which a corresponding data value belongs. Thus, the order information is meaningful only for data included in the same bucket region. For example, user IDs 113 and 247 may be converted respectively into 233 and 367 using the random number "r," and the order information for 233 and 367 may be expressed as 10010000010 and 111100001, respectively, using the above order preserving encryption function "f." That is, since the order information for 113 is greater than that for 247, it is impossible to identify which is greater between 113 and 247 based only on the order information.

Next, the encrypted data, the index information, and the order information are transmitted to and stored in the external server (operation 140).

Later, when a command to store new data is input (operation 150), operation 100 in which corresponding data is encrypted and its subsequent operations are performed to add new data information to the external server.

For example, when new data added to the database has a user ID of 277 and a salary of 740, it is encrypted to generate an E-tuple of $E_K$(277, 740)=1111000011000 . . . . Then, the user ID 277 is converted into 397 using r=120. Referring to FIG. 3, since 397∈[320, 420], the index $\alpha_2$ is allocated.

In addition, the order information for 397 is identified using the following equation:

$$f_{[320,420]}(397) = \left[\frac{397-320}{420-320}\right] \cdot 2^{10} = 788 = 1100010100_2$$

That is, ($\alpha_2$, 1100010100) is allocated to an E-ID, and ($\beta_3$, 1011001100) by calculating E-salary in the same way that the order information for the E-ID is calculated. Then, the above information is transmitted to the external server to update existing information in the external server.

Figure 4:
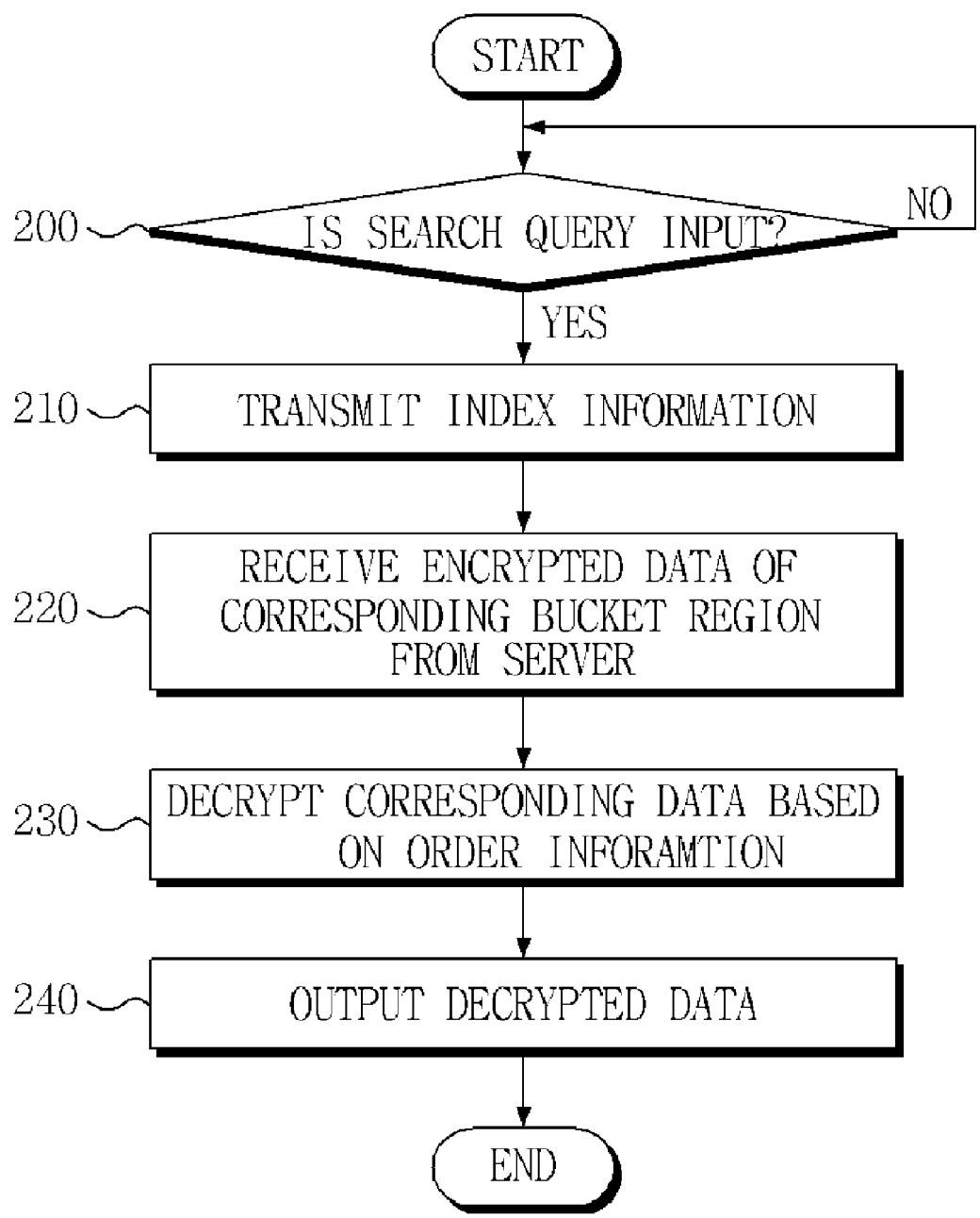
FIG. 4 is a flowchart illustrating a method of retrieving data of a database according to an exemplary embodiment.

FIG. 4 is a flowchart illustrating a method of retrieving data from an external server according to an exemplary embodiment. FIG. 5 is an exemplary format of data stored in an external server.

Referring to FIG. 4, a user inputs a search query to search for encrypted data stored in an external server (operation 200). The search query input by the user is transmitted to the external server. The user transmits data type information and index information to the external server by using a random number "r", bucket information, and indexes (operation 210).

For example, when it is desired to search for encrypted data that belongs to an ID of [50, 240], the user converts [50, 240] into [170, 360] using the stored random number "r." Here, [170, 360] may be divided into [170, 320]∪[320, 360] based on bucket region information stored in advance. In addition, it can be identified from the bucket region information that [170, 320]⊂[120, 320] and [320, 260]⊂[320, 420]. Ultimately, the user transmits corresponding index information and data type information (ID, $\alpha_1$, $\alpha_2$,) to the external server. Then, the user generates order information for 170 and 360 which are limit values of a data range that the user is searching for:

$$f_{[120,320]}(170) = \left[\frac{170-120}{320-120}\right] \cdot 2^{10} = 256 = 100000000_2$$

$$f_{[320,420]}(360) = \left[\frac{360-320}{420-320}\right] \cdot 2^{10} = 409 = 110011001_2$$

Next, the user receives encrypted data, which matches the data type information and the index information, from the external server (operation 220). Referring to FIG. 5, encrypted data (E-tuple), index information and order information, which correspond to the encrypted data, are stored in the external server. For example, when receiving (ID, $\alpha_i$, $\alpha_2$), the external server transmits E-tuples and E-IDs, which correspond to indexes $\alpha_1$ and $\alpha_2$, to the user. Here, the external server may transmit the following E-tuples and E-IDs in first, third, fourth, fifth and eighth rows of a table shown in FIG. 5 to the user:

(1100110011100 . . . ; $\alpha_1$, 1110101)—(1)
(1010011001111 . . . ; $\alpha_1$, 1001000010)—(2)
(1111010000111 . . . ; $\alpha_2$, 101100110)—(3)
(1001011001110 . . . ; $\alpha_2$, 111100001)—(4)
(1001011010010 . . . ; $\alpha_1$, 110001111)—(5).

Next, of the encrypted data received from the external server, corresponding data is decrypted based on order information of a data region which was included in the search query (operation 230).

For example, data corresponding to the index $\alpha_1$ is (1), (2) and (5) as shown above. The user calls $f_{[120, 320]}(\mathbf{170})$=100000000, which is order information previously generated, before decrypting all of the data and compares the called order information with the order information of (1) (2) and (5). Since the user desires to search for data in a data range greater than 170, data having order information greater than 100000000 is selected. That is, data (2) and data (5) are selected, and E-tuples for the data (2) and data (5) are decrypted using a user secret key K. Similarly, in the case of the index $\alpha_2$, only data (4) is selected. Finally, the decrypted data is output to the user (operation 240). According to the above aspect of the present invention, there is no need to decrypt all data included in two bucket regions and received from the external server. Instead, data included only in a range that a user desires to search for can be decrypted.

In a large database, a large amount of data is stored in one bucket region. Therefore, if only data within a desired data range is decrypted, the decryption time and data load can be reduced, thereby increasing decryption efficiency.

According to the present invention, when a database containing data regarding at least one user is stored in an external server, the security and efficiency of the database can be increased.

In addition, of encrypted data received from an external server, only data corresponding to a user query is decrypted. Therefore, the decryption time can be reduced, and the efficiency of a user system can further be increased. Moreover, the present invention can be readily applied to an existing database.

The above-described methods of storing and retrieving data of a database can be written as a computer program. In addition, the computer program can be stored in a computer-readable medium and read and executed by a computer. Examples of the computer readable medium include a magnetic storage medium and an optical recording medium.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of storing data in a database, the method comprising:
    encrypting desired data from among data stored in a database;
    dividing an entire region of the stored data into a plurality of bucket regions and allocating an index to each of the bucket regions;
    identifying order information in a bucket region to which the encrypted data belongs; and
    storing the encrypted data, index information of the bucket region to which the encrypted data belongs, and the identified order information in an external server.

2. The method of claim 1, wherein in the dividing of the entire region and the allocating of the index, the entire region of the stored data is divided in such a way that causes a minimum difference between the numbers of elements of the encrypted data in the is bucket regions.

3. The method of claim 1, wherein in the encrypting of the data, the data is encrypted using a symmetric key algorithm, based on a secret key generated by a user.

4. The method of claim 1, wherein the dividing of the entire region and the allocating of the index comprises:
    generating a random number for security;

adding the generated random number to each of the bucket regions; and allocating an index to each of the bucket regions to which the generated random number has been added.

5. The method of claim 1, wherein in the dividing of the entire region and the allocating of the index, a value obtained by applying a hash function to a stating value of each of the bucket regions is allocated as an index to a corresponding one of the bucket regions.

6. The method of claim 1, wherein in the identifying of the order information, encrypted order information is generated using an encryption function for encrypting the order information.

7. The method of claim 6, wherein the encryption function comprises a data value and starting and end values of the bucket region to which the encrypted data belongs as variables.

8. The method of claim 1, wherein in the identifying of the order information, order information limited to the bucket region to which the encrypted data belongs is generated.

9. The method of claim 1, further comprising:

encrypting new data added to the database and allocating an index to a bucket region to which the encrypted new data belongs;

is identifying order information in the bucket region to which the encrypted new data belongs; and storing the encrypted new data, index information of the bucket region, and the identified order information in the external server.

* * * * *